Dec. 20, 1949  T. HOFFACKER, JR  2,491,812
AIRCRAFT WHEEL BRAKE
Filed April 3, 1947
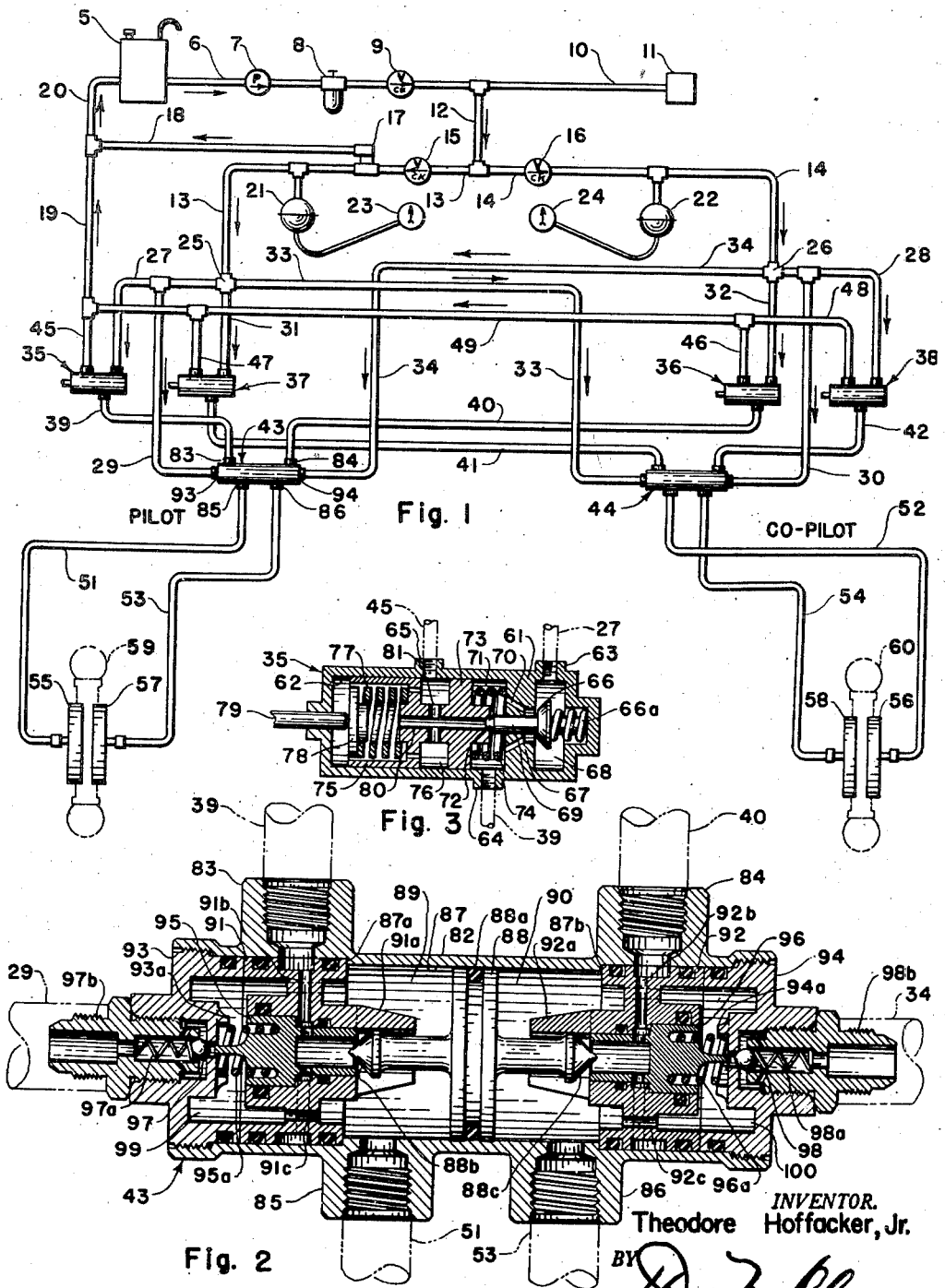
INVENTOR.
Theodore Hoffacker, Jr.
BY
*[signature]*
ATTORNEY Patented Dec. 20, 1949

2,491,812

UNITED STATES PATENT OFFICE 2,491,812

AIRCRAFT WHEEL BRAKE

Theodore Hoffacker, Jr., Hagerstown, Md., assignor to Fairchild Engine and Airplane Corporation, a corporation of Maryland Application April 3, 1947, Serial No. 739,067

15 Claims. (Cl. 188—152)

This invention relates to wheel brakes, and more particularly to improved brake arrangements, controls and systems for use on the wheels of aircraft and other wheeled vehicles.

An object of the present invention resides in the provision of an improved brake arrangement or system for installations incorporating a plurality of independent brake units operatively associated with each wheel of a vehicle. It is also an object to provide a brake system for an aircraft having at least two landing wheels each of which incorporates two or more braking units, together with means for selectively actuating said brake units from separate operating positions, such as by the pilot and co-pilot of the airplane. Another object resides in the provision of a brake system for a multiple wheeled vehicle in which multiple brakes on each wheel are so interconnected and controlled as to be operable from either or both of two operating stations.

It is a further object of the present invention to provide a brake system for a multiple wheeled vehicle having at least two brake units for each wheel in which system equal braking pressures are applied to the respective brake units. It is also an object of this invention to provide a multiple brake unit installation for a pair of aircraft wheels in which equal braking pressures may be applied to each brake unit from either one, or both, of the pilot and co-pilot stations. A further object resides in the arrangement of the fluid piping in a hydraulic brake system incorporating novel interconnector and equalizer means interposed between the normal brake valves and the outboard and inboard brake units of the respective wheels, which provide a brake system of increased flexibility and reliability.

Another object of this invention resides in the elimination of the necessity for any mechanical linkage or its equivalent between the pilot and co-pilot brake pedals in airplanes employing independent hydraulic systems for the actuation of the inboard and outboard brake units. It is a still further object to provide a brake system in which both inboard and outboard brakes are adapted to be applied by either the pilot or co-pilot, or both, while at the same time isolating the inboard brake hydraulic system from the outboard brake hydraulic system. It is a further object of this invention to provide a brake system which permits independent operation of either the inboard or outboard brake portion of the system in the event of the failure of the other of these system portions. Another object resides in the provision of a system in which the full braking capacity of either the inboard or outboard brake portion of the system can be applied by either the pilot or co-pilot, or both. Further objects reside in the refinement of operation of brake systems by the use of an improved hydraulic interconnector and equalizer which derives a smoother and more gradual application of the brakes due to the effect of a slight differential action resulting from the operation of this improved device.

Other objects and advantages of the present invention will be apparent to those skilled in the art from the following detailed description of a preferred embodiment of the invention, and the details of its parts, made in connection with the accompanying drawings, in which:

Figure 1 is a diagrammatic illustration of a preferred form of the improved brake system;

Figure 2 is a detailed cross-sectional view of the interconnector and equalizer means; and Figure 3 is a schematic view of the operating elements of a typical brake valve.

Referring now to Figure 1, the brake system is shown schematically, as viewed looking forwardly in a typical aircraft, with the pilot's position shown on the left, and the co-pilot's position shown at the right. The hydraulic brake fluid is stored within the reservoir 5 from which it is drawn through the line 6 by the pump 7. It is delivered at high pressure, which may be of the order of 1,000 lbs. per sq. in., through the filter 8 and the check valve 9. A branch line 10 runs to the pressure switch 11, which is adapted to interrupt the motor-driven pump 7 in the event any excessive pressure is developed within the line 10, or that portion of the system to which it is connected. The main pressure supply line is indicated at 12 from which it branches to the left and to the right into the branch pressure lines 13 and 14. As the fluid pressure enters each of these branch lines, it passes through the check valves 15 and 16, respectively, which prevent fluid from flowing back into the main pressure line 12, and back to the discharge side of the pump. In the branch pressure line 13, there is provided a pressure relief valve 17, which is connected by means of the relief line 18, to the main return line 19 and thence through the return line portion 20 and back into the reservoir 5. Connected to the branch pressure line 13 is an accumulator 21 and a pressure indicating gauge 23, and a similar accumulator 22 and pressure gauge 24 is connected to the branch pressure line 14.

As the left branch pressure line continues, it branches at the cross connection 25 into the further pressure lines 27, 29 and 31 which communicate with the set of operating valves on the left or pilot's side of the airplane. As the right branch pressure line continues, it also separates at the cross-fitting 26 into the further pressure lines 28, 30 and 32 which communicate with the set of operating valves on the right or co-pilot's side of the airplane. From the cross-fitting in the pressure line 13 at the left side of the airplane a pressure branch 33 extends across to the right side of the airplane, and similarly a pressure line 34 from the fitting 26 in the pressure line 14 on the right side of the airplane extends across to the left side of the airplane.

The pilot's position on the left side is provided with a pair of pedal actuated brake valve assemblies 35 and 37 which receive their fluid pressure through the above mentioned lines 27 and 31 respectively, and the co-pilot's position on the right side of the airplane is provided with similar brake valve assemblies 36 and 38 which receive their fluid pressure through the lines 32 and 28 respectively. The brake valves 35, 36, 37 and 38 are each identical and will be more fully explained in connection with the detailed showing of the valve 35 in Figure 3. Each of these valves is provided with connections to the wheel brakes through the lines 39, 40, 41 and 42 respectively, through the interconnector and equalizer valves 43 and 44 which are more fully shown in detail in Figure 2. The improved valve construction shown in Figure 2 forms the subject matter of a division of this application which was filed on November 10, 1949, being application Serial No. 126,519 for "Automatic valve means." The brake valves 35, 36, 37 and 38 are provided with connections to the main return line 19 by way of the branch lines 45, 46, 47 and 48 respectively, the latter three lines being connected into the return header 49 to join the main return line 19 at its junction with the branch return 45 from the valve 35.

The airplane to which the present brake system is shown and described as being applied is preferably provided with a pair of laterally disposed landing wheels each of which is provided with inboard and outboard wheel brake units. The left interconnector and equalizer valve 43 is provided with an outlet 85 in communication with the fluid line 51 to the outboard wheel brake unit 55 of the left landing gear wheel 59. Similarly there is provided an adjacent outlet 86, in the interconnector and equalizer valve 43, for communication through the line 53 with the inboard wheel brake unit 57 of the same left wheel 59. The right interconnector and equalizer valve 44 is similarly provided with adjacent outlets and communication through the lines 52 and 54 with the outboard and inboard wheel brake units 56 and 58, respectively, of the landing gear wheel 60 on the right side of the airplane.

Referring now to Figure 3, the numeral 35 indicates the pedal-actuated brake valve 35 shown in the diagram in Figure 1, which valve is also identical with the brake valves 36, 37 and 38. This brake valve, which is shown schematically in this figure may preferably be of the type shown and described in Patent No. 2,397,234 to J. R. Blake which issued March 26, 1946. The valve comprises essentially a substantially cylindrical body or housing portion 61 having a straight bore 62 of uniform diameter throughout, and closed at the ends of the housing by suitable removable flanged caps, the fastening means for which have not been shown in this schematic cross-section. An internally screw threaded port 63 is provided for coupling the pressure line 27 to the valve, and similar ports 64 and 65 are provided for coupling the fluid line 39 and the return line 45, respectively.

A pressure valve unit 66 is mounted for axial movement within the cylindrical body of the valve, being guided within the valve guide abutment portion 67, which forms a pressure chamber 68 open to the pressure inlet port 63. The pressure valve unit 66 includes a piston stem portion 69 within the guide portion 67, which guide portion is provided with ports 70 serving to provide communication between the pressure chamber 68 and the chamber 71 which is open to the brake actuating line 39 through the threaded port 64. A piston-valve unit 73 is reciprocally mounted within the bore 62, having a long skirt or guide portion 75 at its farther end to form an intermediate chamber 76 open to the return port 65 and the return line 45. The adjacent end of the stem 69 is adapted to form, in cooperation with the adjacent end of the piston portion 73, a return valve unit 72 which is urged into its normal position by the compression spring 74 interposed between the abutment portion 67, and the piston portion 73. Within the skirt portion 75 at the other end of the reciprocable piston-valve, there is interposed a further compression spring 77 between the piston-valve unit and the keeper 78.

The piston-valve assembly 73 is also provided with a central bore or passage 80 which allows fluid communication between the chamber 71 and the chamber within the skirt portion 75, and the transverse branches 81 provide communication between the central bore 80 and the return chamber 76. A plunger or stem 79 is guidingly mounted for axial reciprocation through the end wall of the cylindrical body 61, bearing against the keeper 78. This plunger is arranged to transmit braking forces from the operator's foot, through suitable pedal mechanism, against the keeper 78, the compression spring 77, and the elements comprising the brake valve assembly 35. It will be understood that suitable packing rings or seals are preferably disposed at each of the surfaces between the relatively moving parts of the present valve assembly in order to provide a fluid-tight arrangement, and that these seals have necessarily been omitted from the schematic showing in Figure 3 for purposes of clarity.

Referring now to Figure 2, there is shown an enlarged cross-section of the interconnector and equalizer valve assembly 43 on the left or pilot's side of the airplane, which assembly is identical in construction with its counterpart 44 on the right, or co-pilot's side of the airplane. The valve assembly 43 comprises a cylindrical body portion 82, in which there has been integrally formed the internally threaded ports 83, 84, 85 and 86, adapted to be connected to the lines 39, 40, 51 and 53, respectively. It will be noted from Figure 1, that the line 39 communicates with the brake valve 35 on the left side of the airplane, and that the line 40 communicates with the brake valve 36 on the right side of the airplane. The lines 51 and 53, communicate with the outboard and inboard brake units 55 and 57, respectively of the left wheel 59. The body or housing portion 82 is provided with a centrally bored cylinder portion 87 within which the primary piston 88 is adapted to reciprocate in the axial direction of the cylinder. The piston 88 is provided with a suitable pressure seal 88a and divides the centrally bored portion into the chambers 89 and 90.

The body 82 of the valve assembly is bored at each end to a slightly larger diameter than that of the central bore 87, which the end bores meet at the shoulders 87a and 87b. Valve guide portions 91 and 92 are disposed within the enlarged diameter end portions of the body 82, being retained therein by the threaded end cap portions 93 and 94, respectively. The central piston 88 is provided with axially extending rod portions having valves 88b and 88c formed at each end. The valve guide portion 91 has a tapered spider portion 91a extending into the chamber 89 adapted to guide the piston valve end 88b and the corresponding valve guide element 92 has a like portion 92a for guiding the valve end 88c. The valve guide element 91 is bored for the reception of a reciprocable valve member 95, and its counterpart, the valve guide element 92 has a similar internally bored portion for receiving the reciprocable valve element 96. The end cap portion 93 is arranged to house a spring loaded ball valve 97 in conjunction with the terminal fitting 97b and the interposed spring 97a. Similarly the end cap 94 houses the spring loaded ball valve 98 in cooperation with the terminal fitting 98b and the interposed spring 98a.

The terminal fittings 97b and 98b are suitably threaded to engage the end caps 93 and 94, having shouldered portions by which they may be tightened against the end caps and are provided with threaded terminals for engagement with the pressure lines 29 and 34, respectively. Radially disposed passages 91b are provided within the guide element 91 to provide communication between the central chamber portion 89 and the port 83 when the valve 88b is in the open position, and the guide element 92 is similarly provided with radial passages 92b to provide similar communication between the chamber 90 and the port 84 when the corresponding valve element 88c is in the open condition. The valve guide elements 91 and 92 have their internally bored portions shouldered to limit the inward position of the reciprocable valves 95 and 96, which are urged thereinto by the compression springs 95a and 96a. The guide element 91 and the end cap 93 are adapted to form between them the end chamber 99 which is in communication with the central chamber 89 by means of the communicating passages 91c extending longitudinally through the guide element 91. Similarly the guide element 92 and the end cap 94 form between them the end chamber 100 which is open to the central chamber 90 at all times by virtue of the longitudinal communicating passages 92c extending through the guide element 92.

It will accordingly be noted from an examination of Figure 2, that the primary piston 88 and its valve portions 88b and 88c guided by the portions 91a and 92a respectively, are free to move, either to the left, or to the right as the case may be. The sliding valves 95 and 96, retained by the guide elements 91 and 92, respectively, are urged by the springs 95a and 96a, into their positions of closest approach, in which they bear against the shouldered portions of the bores of the guide elements 91 and 92 but in which they each fall short of closing the valves formed by the piston portions 88b and 88c. Opposite or outward movement of the valves 95 and 96, however, within the limits of their motion and by compression of their respective springs 95a and 96a, can unseat the ball valves 97 and 98. They are limited in such outward movement by contact with the stop portions 93a and 94a on the respective end cap fittings. The central chambers 89 and 90 extend through the valve guide elements 91 and 92, respectively, into the chambers 99 and 100, as described above, by virtue of the passages 91c and 92c. As also indicated above, the port 83 is placed in communication with the central chamber 89 by the radial passageways 91b, as controlled by the valve 88b; and similarly the port 84 is placed in communication with the central chamber 90 by the radial passages 92b as they may be controlled by the valve 88c. Similarly the pressure lines 29 and 34 are axially disposed at the opposite ends of the interconnector and equalizer valve 43 and are closed off from their respective chambers 89—99 and 90—100 by means of the spring loaded ball valves 97 and 98 respectively. As in the case of the brake valve schematically shown and described in connection with Figure 3, each of the relatively moving or movable elements of the present valve are also provided with pressure seals to prevent leakage of fluid at elevated pressures between these elements, or past the respective valve units.

As indicated in Figure 1, two assemblies of the interconnector and equalizer valves, namely assemblies 43 and 44, are required for each dual installation. One valve assembly, namely 43, is connected to the pilot's left foot brake valve 35 by the line 39, and the same assembly 43 is also connected to the co-pilot's left foot brake valve 36 through the line 40. The line 39 from the pilot's left foot brake valve 35 is capable of communication with the outboard left wheel brake unit 55 through the line 51 as controlled by the left side of the assembly 43; and the line 40 from the co-pilot's left foot brake valve 36 is capable of being placed in communication with the inboard wheel brake unit 57 of the left wheel 59 by means of the line 53 as controlled by the right side of the assembly 43. Similarly the right wheel 60 is subject to brake control from the pilot's and co-pilot's right foot brake valves 37 and 38, through the lines 41 and 42, respectively, which are capable of being placed in communication with the lines 52 and 54, upon proper actuation of the interconnector and equalizer assembly 44 for the control of the outboard and the inboard wheel brake units 56 and 58, respectively, of the right wheel 60.

The description of the operation of the dual brake system shown in Figure 1, embodying the valve assemblies shown in detail in Figures 2 and 3, involve the four principal stages of a complete cycle of operation, namely: (1) Brakes off; (2) brakes being applied; (3) brakes applied and pressure equalized; and (4) brakes being released.

In the first stage of operation, namely the "brakes off" condition, let us assume that the system shown in Figure 1 has been filled with an adequate supply of brake fluid throughout all portions of the system and to the required level within the reservoir 5. The pump 7 is driven from a suitable power source, drawing fluid through the line 6 into and through the filter 8, past the check valve 9 and into the main pressure line 12, from which it branches through 13 and 14 into the left and right halves of the system, respectively. In branching into the two halves of the system the fluid passes through the respective check valves 15 and 16, past those portions of these pressure lines which are open to the accumulators 21 and 22. The latter serve to accumulate and build up a reserve pressure on the work side of each accumulator, which pressure is indicated by the pressure gauges 23 and 24, respectively. The pressure switch 11 at the end of the branch line 10 provides an unloading feature by disconnection of the power source of the pump 7 upon the creation of excessive pressures. A further relief from pressures in excess of a predetermined magnitude is provided by the pressure relief valve 17 past which the fluid is returned through the relief line 18 and the return line 20 to the reservoir 5, as previously described, to relieve the system of such excess pressures. Accordingly, with the pump running and the full pressure upon the system and without braking forces applied to the pedal plungers 79 of the brake valves 35, 36, 37 and 38, the full pressure will be built up within the pressure chambers 68 of each brake valve as the fluid is transmitted through the pressure branches 27, 28, 31 and 32. In this condition of the system the pressure valve unit 66 of the brake valve 35 (as well as that of the remaining brake valves 36, 37 and 38) will be in the closed position due to the influence of the spring 66a, assisted by the pressure within the line 27 (and the corresponding branches 28, 31 and 32 to the remaining brake valves), and the piston valve 72 will be open due to the influence of the spring 74 moving the piston assembly 73 toward the end of the bore 62 at which it overcomes the lack of brake force on the plunger 79. This places the relief line 18 as well as all of the return portions of the system under atmospheric pressure, and inasmuch as each of the brake valves has its pressure valve unit closed, and its piston valve open, the lines 45—39, 47—41, 46—40 and 48—42 will be open to each other; and accordingly the lines 39, 40, 41 and 42 will also be at atmospheric pressure.

Referring now to Figure 2, inasmuch as the lines 39 and 40 connected to ports 83 and 84, respectively, are under atmospheric pressure, the piston 88 will be in its normal central position at which the valves 88b and 88c will be open and the pressure within the chambers 89 and 99 through the passages 91c, and that within the chambers 90 and 100 through the passages 92c, will also be equal and at atmospheric pressure. The pressure lines 29 and 34 connected to the opposite ends of the assembly 43 are, however, open to the main pressure line 12, and its branches 13 and 14, and the valves 97 and 98 will be closed by their respective springs against the pressure within the system (which might preferably be of the order of one thousand pounds per square inch). The fluid at the terminal connections at the closed ball valves 97 of the assemblies 43 and 44 is accordingly under a pressure of about 1000 p. s. i., and its source is through the power branch 13, and the lines 29 and 33 to the assemblies 43 and 44. The further lines 51 and 52 control the outboard portion of the brake units 55 and 56, or the outboard brake hydraulic system. The fluid at the opposite ball valves 98 is also under a like pressure of about 1000 p. s. i., but its source is through the pressure branch 14 and the branches 34 and 30, which through the respective assemblies 43 and 44 and the further lines 53 and 54 control the inboard brake units 57 and 58, or the inboard portion of the brake hydraulic system. Accordingly, in addition to the relief and return lines, each of the brake valves 35, 36, 37 and 38 is under atmospheric pressure except for their pressure chamber portions up to the pressure valves 66, and the lines 39 and 40 through the central portion of the valve assembly 43, to the brake units 55 and 57, are also under atmospheric pressure. Similarly the lines 41 and 42, and the central chamber portions of the valve assembly 44, through to the brake units 56 and 58, are also under atmospheric pressure and the brake units, 55, 56, 57 and 58 accordingly are each in the "brakes-off" condition.

The operation of the system and its parts for the second stage, namely, "brakes being applied," is as follows: Let us assume that the pilot applies the brakes in his portion of the system by exerting braking forces upon the pedal plungers 79 of the brake valves 35 and 37 on his, or the left side of the airplane. This movement of the plunger 79 initially closes the valve 72 thereby closing off the operating line 39 from the return line 45 and the corresponding operating line 41 from its return line 47. Further movement of the plunger 79 and the piston 73 opens the pressure valve 66, subjecting the line 39 to a braking pressure. Chambers 89 and 99 at the left side of each interconnector and equalizer valve assembly 43 and 44 is accordingly subjected to the braking pressures corresponding to that which is passed by the respective brake valves 35 and 37. Since the primary piston 88 is unrestrained, and the chamber 90 is at atmospheric pressure and appreciably below that in the chamber 89, it is obvious that the piston must move to the right, or in the direction of chamber 90, thereby closing the passage between chamber 90 and passage 92b by the closing of the valve 88c. A similar operation obviously will occur in assembly 44. As the braking pressure continues to be applied and is increased in magnitude, the primary piston 88 continues to move toward the right in each of the assemblies 43 and 44, moving the sliding valve unit 96 along with it toward the right, which action in turn causes the small valve 98 to be unseated and opened, thus permitting high pressure fluid to enter the chamber 100 and to be directed through the port 86 of each assembly 43 and 44, and thereby into the lines 53 and 54 connected to the inboard brake units of each wheel, or the inboard brake system. During this continued movement of the piston 88 the sliding valve unit 96 maintains the closed condition of the valve 88c, thereby preventing fluid pressure flow back into the line 40.

The condition of the entire system and its parts for the third condition, namely "brakes applied and pressure equalized," is as follows: Continued application of pedal braking forces to the brake valves 35 and 37 consequently maintains the valves 66 in the open position and the valves 72 in the closed position, permitting continuation of fluid pressure flow through the ball valves 98 of each assembly 43 and 44, such that the pressure on both sides of the primary piston 88 gradually becomes equalized at the brake operating pressure. This also means that the pressure in the brake line 53 connected to the port 86 is now equal to the pressure in the brake line 51 connected to the port 85, and these pressures are also equal to those in the brake lines 52 and 54, assuming equal pressures applied to the pedal plungers 79 of units 35 and 37. This equalizing condition between the brake units of a given wheel exists by virtue of the fact that, as the pressure in chambers 90 increases due to fluid entering through the ball valves 98, the primary pistons 88 are forced to move to the left or toward the chambers 89, as the pressure in the chambers 90 becomes slightly greater than that in chambers 89. The ball valves 98 close due to the concurrent movement of the pistons 88 and valve elements 96, thus preventing any further increase in pressure. As the sliding valve elements 86 again reach their normal positions the continued piston movement opens the valves 88c. The slightly greater pressure in chambers 90, which is required to move the primary pistons 88, is relieved through the passageways 92b, past the now open valves 88c into the line 40, (and 42) each of which is under atmospheric pressure. This results from the continued movement of primary pistons 88 in the direction of chambers 89 and the opening of valves 88c creating communication between chambers 90 and the passages 92b. As soon as this excess pressure is relieved, the relief action discontinues and the passages 92b are again closed by the valves 88c by virtue of the position of the pistons 88 which are not as yet in their central positions but are still displaced toward the right, or chambers 90. The brake line pressures at the ports 85 and 86 are thus equalized, thereby equalizing the pressures within the brake lines 51 and 53, and the braking pressures applied at the brake units 55 and 57, as well as at the brake units 56 and 58 of the other wheel. It will be understood that similar actuation of the brakes can be accomplished by the co-pilot by similar application of braking forces upon his brake valves 36 and 38 on the right side of the airplane with the balancing of the brake line pressures accomplished by similar but opposite movement of the primary pistons 88 in each of the interconnector and equalizer assemblies 43 and 44.

The operation of the system and its parts under the fourth, or "brakes being released" condition, is as follows: As the force exerted by the pilot's feet against the plungers 79 of the valves 35 and 37 is released the piston portions 73 of the brake valves 35 and 37 follow the outwardly moving plungers 79 to the left carrying with them the pressure valve assemblies 66 and 72 (the valves 72 closing first and remaining closed temporarily), and the valves 66 subsequently closing off the fluid pressure after sufficient piston movement has taken place. The braking pressure initially applied through the lines 39 and 41 to the ports 83 of the valves 43 and 44 is accordingly cut off from lines 27 and 31, and the fluid from the brake lines 51 and 52 connected to the ports 85 passes into the chambers 89, past the open valves 88b, through the passageways 91b and into the lines 39 and 41. As the plungers 79 recede further from the interior of the brake valves 35 and 37, the piston units 73 continue movement past the point where the valves 72 again open, some time after the closing of the pressure valves 66, and the lines 39 and 41 then become open through the ports 64, past the open valves 72 and the passages 80 and 81, into the return line 45 and 47 through the ports 65. This permits the braking pressure initially applied to the brake lines 51 and 52 to pass through the interconnector and equalizer valve assemblies 43 and 44, and the brake valves 35 and 37, and to be returned to the hydraulic reservoir 5 through the return lines 45, 19 and 20, respectively. Simultaneously with the reduction of pressure in the chambers 89 by fluid returning to the reservoir 5, communication between the passageways 92b and the chambers 90, past the valves 88c, is opened due to the further movement of the primary pistons 88 in the direction of chambers 89, caused by the differential pressure between chambers 89 and 90. The brake line pressure at the ports 86 through the brake lines 53 and 54 then is relieved and hydraulic fluid from the brake units 57 and 58 return to the reservoir 5 by way of the lines 53, and 54, the ports 86, the chambers 90, past the valves 88c, through the pasageways 92b and the lines 40, and 42 through the brake valves 36 and 38, the return branches 46 and 48, the return header 49 and the main return line 19—20. With the release of the brakes and the return of the pistons 88 and all of the remaining elements to their neutral positions, as has just been described, one full cycle of operation has been completed, and the system has again returned to the original static stage as described in the first, or "brakes off," condition.

It will acordingly be seen that a dual braking arrangement has been provided in which independent operation of either the inboard or outboard brake system is possible, in the event of the failure of either one of these systems. Inasmuch as each operator station is supplied by a separate pressure line and controls either the inboard or outboard systems having a brake unit on each wheel, either system can be operated independently of the other, should failure occur in the other portion of the system. It will also be noted that the full braking capacity of both the inboard and outboard brake systems is available to, and can be applied by either the pilot, or the co-pilot, or both. It will also be observed that these functions and operations are accomplished without the necessity of any mechanical linkage connecting the pilot and co-pilot brake pedals, which thereby eliminates design complications and critical adjustments heretofore required by such linkages. To dispense with these mechanical linkages further eliminates a source of possible difficulty, and cause of failure of the entire system. The provision of the novel automatic interconnector and equalizer assembly makes it possible to provide a smoother and more gradual application of the brakes than has heretofore been possible in similar systems. This improved application is due primarily to the differential action of relatively small magnitude resulting from the operation of this equalizer unit. More particularly, and to further clarify this aspect of the invention, the inboard brakes will lead the outboard brakes slightly, or vice versa, depending upon whether the pilot or co-pilot operates the brakes, before equalization of the pressure occurs. This condition results from the fact that one of the systems is operated directly by actuation of the brake valve, while the other system is operated indirectly by the equalizer valve as a secondary reaction to the introduction of pressure in the first system.

It will be understood that the above described modification is but one of many forms which the present invention may take. For example, while the pilot initially controls the outboard brake units of each wheel and the co-pilot controls the inboard brake units, equally effective results may be obtained where the arrangement is reversed, namely, where the pilot controls the inboard, and the co-pilot controls the outboard brake units. It is common practice in large aircraft to provide dual or double wheel landing gear units and the improved brake system is equally applicable to such landing gears regardless of the number of wheels, or the number of brake units per wheel. The system can also be arranged for use on a single wheel controlled from two separate stations. While two brake units have been shown and described for each wheel, obviously the invention is applicable to a greater number per wheel as well as to a vehicle having any number of wheels arranged for braking. It will also be apparent that either operator can brake the wheels with different braking force and when the other half of the system is brought into action the equalization is made only between the units of a given wheel, and not as between the several wheels. The equalization of pressures by the equalizer valve will be as complete as may be obtained in accurately fitting hydraulic equipment of the present type. Accordingly, with due allowance for friction, seals, inertia, etc., the use of the term "equalization" in any of its forms herein will be understood to mean that the pressures will be substantially equalized.

Other forms and modifications of the present invention, which will occur to those skilled in the art after reading the foregoing description, are intended to fall within the scope and spirit of this invention as more particularly set forth in the appended claims.

I claim:

1. In a hydraulic brake system for a vehicle having at least two wheels, inboard and outboard brake units operatively associated with each said wheel, a source of hydraulic pressure, a pair of manually operable brake valves disposed at a first operator station arranged for the actuation of the outboard set of brake units of said wheels, a pair of manually operable brake valves disposed at a second operator station arranged for the actuation of the inboard set of brake units of said wheels, means effecting fluid connections between said pressure source and each said pair of brake valves, means effecting fluid connections between each said brake valve and its respective wheel brake unit, and valve means interposed within said fluid connections between the said brake valves and inboard and outboard brake units of the respective wheels for applying equalized hydraulic pressure to both brake units of one wheel initiated by the actuation of but one of the brake valves connected to that wheel by operation from its operator station without the necessity of actuation of the corresponding brake valve at the other operator station.

2. In a hydraulic brake system the combination with a wheel having a pair of brake units operatively associated therewith, a source of hydraulic pressure, a manually operable brake valve at each of a pair of operator stations, fluid connections between said pressure source and said brake valves and separate fluid connections between each said brake valve and its respective brake units, of means interposed within said separate connections between said brake valves and their respective brake units comprising a valved cylinder divided by a freely movable piston-valve separating each of said separate fluid connections, whereby actuation of one of said brake valves and its respective wheel brake units initiates displacement of said piston-valve and flow of equalized hydraulic pressure from said pressure source through the second said separate fluid connection to the other brake units on said wheel.

3. In a dual hydraulic brake system, interconnecting means for the separate conduits between first and second manually operable brake valves and corresponding first and second brake units, comprising a cylinder, a double-acting free piston-valve reciprocable therein, normally closed valved pressure connections to said cylinder on each side of said piston-valve, ports in said cylinder on each side of said piston-valve for the said separate pressure conduits, a movable valve element in said cylinder on each side of, and cooperating with, said piston valves to cut off the flow in said pressure conduits between the said ports thereof upon approaching displacement of said first piston valve initiated by the actuation of the first said brake valve and the corresponding first brake unit, and upon further approaching displacement of said pistonvalve to open the valved pressure connection for the second said brake unit without the necessity of manually operating its corresponding second brake valve.

4. In a hydraulic brake system, a pair of wheels, a pair of brake units operatively associated with each said wheel, a source of hydraulic pressure, a pair of manually operable brake valves at each of a pair of operator stations, and interconnector and equalizing means effecting fluid interconnection between said pressure source and said wheel brake units whereby either said wheel may be braked with hydraulic pressure equalized between the brake units of such wheel from a brake valve at either operator station.

5. In a hydraulic brake system the combination with a wheel, a pair of brake units operatively associated with said wheel, a source of hydraulic pressure, separate fluid connections between said pressure source and said wheel brake units, a manually operable brake valve controlling each of said separate fluid connections at each of a pair of operator stations, of interconnecting equalizer valve means for applying hydraulic pressure to a second of said brake units initiated by the actuation of the brake valve for a first of said brake units, said valve means interconnecting both said fluid connections and causing equal pressure to be applied to both said wheel brake units.

6. In a hydraulic brake system the combination with a pair of wheels, a pair of brake units comprising first and second units operatively associated with each said wheel, a source of hydraulic pressure, a pair of manually operable brake valves at each of a pair of operator stations, and separate conduit means providing communication between said pressure source and each said brake valve, of means effecting fluid connection between said brake valves and said brake units for applying equalized hydraulic pressure to the second of said brake units on a first said wheel initiated by the actuation of the first said brake unit on said first wheel.

7. A hydraulic brake system comprising a wheel having first and second brake units operatively associated therewith a source of hydraulic pressure, a manually operable brake valve for said first brake unit, a manually operable brake valve for said second brake unit, means effecting separate fluid connections between said pressure source and each said brake valve, means effecting separate fluid connection between each said brake valve and its respective first and second brake units, said last means including valve means for applying equalized hydraulic pressure to the second of said brake units initiated by the actuation of the first said brake unit.

8. In a dual hydraulic brake system, interconnecting means for the separate conduits from a pressure source and communicating between first and second manually operable brake valves and corresponding first and second brake units on the same wheel, comprising a cylinder, a double-acting free piston reciprocable within said cylinder, first and second piston-valves operatively associated with said piston, normally closed pressure connections to said cylinder on each side of said piston, a valve operatively associated with each said pressure connection, ports in said cylinder on each side of said piston for the said separate pressure conduits, a movable valve element in said cylinder on each side of, and cooperating with, said piston-valves to cut off the flow in said pressure conduits between the said ports upon approaching displacement of said second piston-valve initiated by the actuation of the first said brake valve and the corresponding first brake unit, and upon further approaching displacement of said second piston-valve to open the valve for the pressure connection for the second brake unit without the necessity of manually operating its corresponding second said brake valve.

9. In a dual hydraulic brake system, left and right wheels, first and second brake units on each said wheel, first and second brake valves for control of the said left and right wheels respectively disposed at a first operator position, a source of fluid pressure in communication with each of said brake valves at both said operator positions, a fluid conduit interconnecting said first brake valve at said operator position with the first brake unit of said left wheel, a free-piston device in fluid communication with said conduit to said first brake unit on said left wheel, fluid pressure connections to said free-piston device, a fluid conduit interconnecting said first brake valve at said second operator position with said free-piston device and with the second said brake unit of said left wheel arranged such that operation of said first brake valve at said first operator position initiates actuation of said free-piston device for placing the second said brake unit of said left wheel in communication with the pressure source for the application of equalized hydraulic pressures to the first and second brake units of said left wheel.

10. In a dual hydraulic brake system, a pair of wheels, first and second brake units operatively associated with each said wheel, a source of hydraulic pressure, a pair of manually operable brake valves at each of a pair of operator stations, fluid conduits placing each said brake unit in communication with said source of hydraulic pressure and a corresponding brake valve, and a free-piston device in fluid communication with both brake units of one said wheel in such manner that said wheel can be braked by actuation of a corresponding brake valve at either of said operator stations.

11. The combination with a dual hydraulic brake system including a pair of wheels, a pair of brake units operatively associated with each said wheel, a source of hydraulic pressure, and a pair of manually operable valves at each of a pair of operator stations, of a free-piston device effecting fluid interconnection between said pressure source and corresponding wheel brake units arranged in such manner that both brake units of a given wheel may be actuated by either one of two brake valves disposed at the different operator stations.

In a dual hydraulic brake system, a wheel, a pair of brake units operatively associated with said wheel, a source of hydraulic pressure, separate fluid connections between said pressure source and said wheel brake units, a manually operable brake valve in communication with and controlling each of said separate fluid connections at each of a pair of operator stations, and a free-piston valve device in fluid communication with said source of hydraulic pressure and said separate fluid connections arranged in such manner that both of said brake units on said wheel may be actuated by operation of either said brake valve.

13. A dual hydraulic brake system including a pair of spaced wheels, inner and outer brake units on each said wheel, a pair of brake valves at a first operator station for normally actuating the outer brake units of said wheels, a pair of brake valves at a second operator station for normally actuating the inner brake units of said wheels, fluid conduits for conducting fluid under pressure from a pressure source through each said brake valve to the said normally controlled brake unit, a piston and cylinder device disposed between and having its opposed faces exposed to the fluids within the conduit normally controlling the outer brake unit of a first said wheel from the first said operator station and within the conduit normally controlling the inner brake unit of the said first wheel from the second said operator station, valve means operatively associated with said device actuatable by movement of said free piston resulting from pressure differential on its opposed faces, means providing fluid pressure source connections to said piston-cylinder device controlled by said valve means arranged such that fluid pressure actuation of the outer brake unit of the first said wheel by selective manual operation of a first of said brake valves at said first operator station applying said actuating fluid pressure to a face of said piston imparts displacement thereto and actuation of said valve means to place said inner brake unit in fluid communication with said fluid pressure source connecting means for the secondary operation of said inner brake unit of said first wheel without manual operation of its corresponding normally controlling brake valve at said second operator station.

14. A brake system of the type set forth in claim 13 characterized by said valve means operatively associated with said piston-cylinder device arranged upon said piston displacement to cut off the normal fluid actuating conduit from said second operator station brake valve when its normally controlled inner brake unit of said first wheel is so secondarily operated.

15. A brake system of the type set forth in claim 13 characterized by the said fluid conduits and said fluid pressure source connecting means exerting equal pressures on the opposed faces of said piston to effect its return toward the neutral position and the equalization of the braking forces applied to the inner and outer brake units of said first wheel.

THEODORE HOFFACKER, Jr.

REFERENCES CITED

The following references are of record in the file of this patent:

UNITED STATES PATENTS

| Number | Name | Date |
|---|---|---|
| 2,208,820 | Tarris | July 23, 1940 |
| 2,212,920 | Kerr, Jr. | Aug. 27, 1940 |
| 2,273,535 | Peo | Feb. 17, 1942 |
| 2,305,759 | Berger | Dec. 22, 1942 |
| 2,400,587 | Livers | May 21, 1946 |
| 2,402,115 | Levy | June 11, 1946 |
| 2,409,335 | Von Stackelberg | Oct. 15, 1946 |